L. C. HILL.
FIGURE TOY.
APPLICATION FILED JULY 19, 1916.
1,199,183. Patented Sept. 26, 1916.
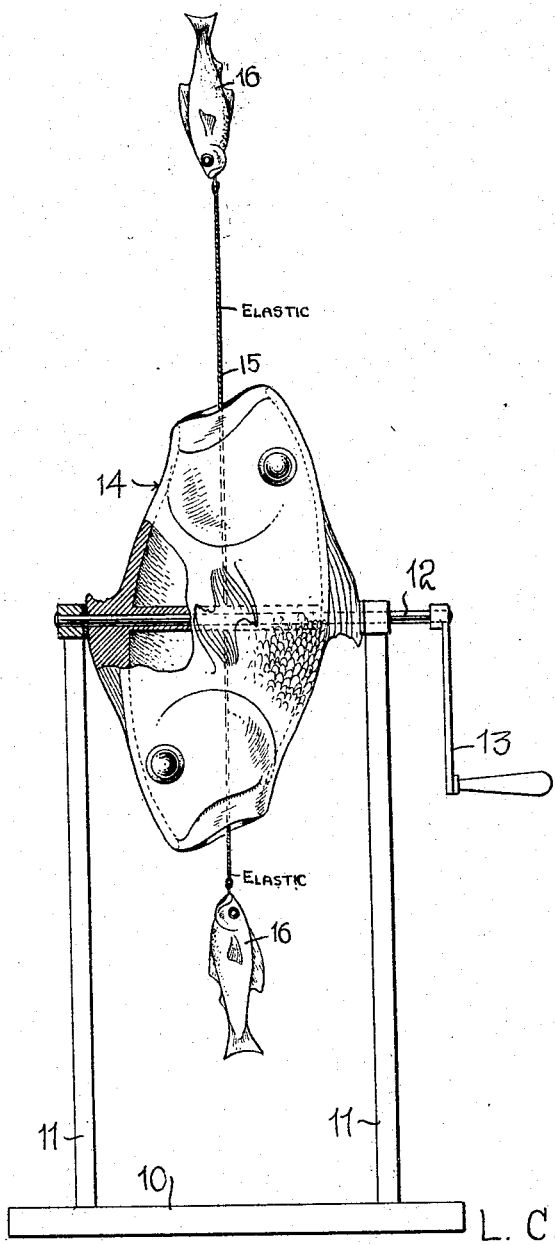
Inventor
L. C. Hill
By Watson E. Coleman
Attorney

UNITED STATES PATENT OFFICE.

LEWIS C. HILL, OF ROSEBURG, OREGON.

FIGURE TOY.

1,199,183.  Specification of Letters Patent.  Patented Sept. 26, 1916.

Application filed July 19, 1916. Serial No. 110,194.

*To all whom it may concern:*

Be it known that I, LEWIS C. HILL, a citizen of the United States, residing at Roseburg, in the county of Douglas and State of Oregon, have invented certain new and useful Improvements in Figure Toys, of which the following is a specification, reference being had to the accompanying drawings.

This invention relates to toys and has for its object the provision of a very simple and amusing toy in which a large fish is displayed as alternately ejecting and swallowing a relatively small fish, the smaller fish being ejected by centrifugal force and retracted by any suitable means.

My invention is illustrated in the accompanying drawing, wherein the figure is an elevation of my toy.

Referring to this figure 10 designates a base upon which is mounted the supporting members 11 having bearings through which a shaft 12 passes, this shaft being provided with a crank 13 at one end or other suitable means for revolving it. Mounted upon this shaft at about its middle is a hollow casing 14 formed and painted to simulate a fish having two heads and mouths, there being a head and mouth at opposite ends. This casing may be either formed of plates joined at the lateral edges or otherwise formed. Mounted upon the shaft 12 is an elastic member 15 which is designed to revolve with the shaft. Attached to the extremities of the elastic member are similitudes of small fishes designated 16. Now by rotating the shaft 12 very rapidly, the centrifugal force will urge the small fishes 16 outward, thus expanding the elastic 15. The elastic will expand to a certain extent as the speed of the shaft increases and then as the speed decreases will retract. When it expands it permits the small fish to apparently be ejected from the mouth of the large fish and when it contracts it will retract the small fish into the mouth of the large fish. A spiral spring may be used in place of the elastic. While it is preferable to mount the shaft 12 in a frame, it may be rotatably supported by one hand of the operator, and the other end of the shaft rotated to accomplish the result aimed at.

Having described my invention, what I claim is:

1. A toy of the character described comprising a support, a rotatable shaft mounted thereon, a hollow member having the form of a large fish or other animal formed with a double head and mouth, said member being mounted to rotate with the shaft, and an elastic member having one end attached within said hollow member and carrying a relatively small object in the shape of an animal which by the retraction of the elastic member is drawn into the mouth of the large animal and by its expansion under centrifugal force is ejected therefrom.

2. A toy of the character described comprising a rotatable shaft, a hollow member having the form of an animal formed with a double head and mouth, said member being mounted to rotate with the shaft, and elastic members having one end attached within said hollow member and carrying relatively small objects which by the retraction of the elastic member are drawn into the mouths of the hollow member, the small objects being ejected from said mouths by centrifugal force.

3. A toy of the character described comprising a rotatable hollow member open at its outer end, and an elastically contractible and expansible member having one end attached within said hollow member and carrying a relatively small object which is normally held by the retraction of the elastic member within the interior of the hollow member, the small object being ejected from said opening by centrifugal force.

4. A toy of the character described comprising a rotatable shaft, a hollow member mounted upon said shaft to rotate therewith and having its outer end open, and an elastic member having one end attached within the hollow member and carrying a relatively small object attached to its outer end, which, by the retraction of the elastic member is normally supported within the hollow member but is ejected from said hollow member by centrifugal force due to rotating the shaft.

In testimony whereof I hereunto affix my signature in the presence of two witnesses.

LEWIS C. HILL.

Witnesses:
VENUS C. KIDWELL,
M. ALBRIGHT.

Copies of this patent may be obtained for five cents each, by addressing the "Commissioner of Patents, Washington, D. C."